(12) United States Patent
Kunimi

(10) Patent No.: US 6,196,048 B1
(45) Date of Patent: *Mar. 6, 2001

(54) TURNTABLE ACCELERATION GENERATING APPARATUS

(75) Inventor: Takashi Kunimi, Tokyo (JP)

(73) Assignee: Akebono Brake Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,469

(22) Filed: Oct. 20, 1998

(30) Foreign Application Priority Data

Oct. 21, 1997 (JP) .................................................... 9-288507
Oct. 21, 1997 (JP) .................................................... 9-288508

(51) Int. Cl.$^7$ ............................ G01P 21/00; G01C 15/10; G01C 21/00; G01C 19/02
(52) U.S. Cl. ............................ 73/1.38; 73/178 R; 73/535; 33/366.12; 74/5.34
(58) Field of Search .................................... 73/1.38, 178 R, 73/493, 535, 540; 33/366.12; 74/5.34

(56) References Cited

U.S. PATENT DOCUMENTS

| | | | |
|---|---|---|---|
| 3,372,572 | 3/1968 | Campbell et al. | ............ 73/1 |
| 3,583,205 | 6/1971 | Erle | ............ 73/1 |
| 4,188,816 | * 2/1980 | Mairson | ............ 73/1.38 |
| 5,353,642 | * 10/1994 | Hasegawa et al. | ............ 73/535 |

FOREIGN PATENT DOCUMENTS

| | | |
|---|---|---|
| 6-18553 | 1/1994 | (JP) . |
| 7-110342 | 4/1995 | (JP) . |
| WO 95/06259 | 3/1995 | (WO) . |

* cited by examiner

*Primary Examiner*—Hezron Williams
*Assistant Examiner*—Jay L. Politzer
(74) *Attorney, Agent, or Firm*—Morgan, Lewis & Bockius LLP

(57) ABSTRACT

A turntable acceleration generating apparatus includes a first servo motor, a large-diameter turntable rotated by the first servo motor, and a small-diameter turntable being mounted on the large-diameter turntable at a position offset from the central axis of the large-diameter turntable such that the small-diameter turntable is rotated by a rotary shaft. Furthermore, the turntable acceleration generating apparatus includes a signal line for deriving signals from an acceleration sensor located on one of the sides of the large-diameter turntable, and a control signal line for applying control signal to a second servo motor located on the other side of the large-diameter turntable, wherein the large-diameter turntable is grounded such that the large-diameter turntable prevents noise leakage from the control signal line to the signal line.

16 Claims, 5 Drawing Sheets

NO NOISE

CONTROL SIGNAL OF SERVO MOTOR IS SUPERPOSED ON SIGNAL FROM ACCELERATION SENSOR

STATE OF OPERATION
OF SECOND SERVO MOTOR

TURNTABLE ACCELERATION GENERATING APPARATUS

BACKGROUND OF THE INVENTION

1. Field of the Invention

The present invention relates generally to a centrifugal acceleration tester, and more particularly to a turntable type acceleration generating apparatus applicable for examining characteristics of an acceleration sensor for sensing an acceleration, e.g., force, acceleration, and magnetism, which is capable of reducing noise generated during the measurement for examining characteristics of an acceleration sensor or reducing noise, i.e., undesirable acceleration generated due to the drive torque of a servo motor for a rotating small-diameter turntable.

2. Related Art

The following control is widely conducted. Force, acceleration, magnetism of an object moving in a three dimensional space, e.g., robots and air planes, and another object moving in two-dimensional space, e.g., motor vehicles, are sensed by an acceleration sensor. Motions of the object or various devices carried on the object are controlled in accordance with the thus gathered data, for intended purposes. Various types of acceleration sensors are currently used for this type of control. It is necessity to know the characteristics of the acceleration sensors before the sensors are assembled into the control devices.

A vibration tester is currently used for examining the characteristics of the acceleration sensor. The examining method using the vibration tester has the following problems, however.

1) The method examines an acceleration characteristic of an object to be examined, i.e., an acceleration sensor, in a manner that the object is located on a testing table and subjected to a reciprocative acceleration. The testing table somewhat slants during the reciprocative operation (vertical vibration) of the testing table. The table slanting makes it difficult to secure an exact reciprocative motion. Where the table slants, a force component is additionally applied to the acceleration sensor under test in the directions different from those of the reciprocative forces. The resultant of the measurement includes an interference component in addition to an acceleration of the sensor. The interference component contained in the measurement result impairs the examination of the characteristics of the acceleration sensor in examination exactness.

2) In the vibration tester, the acceleration sensor actually vibrates by use of a vibration generator. Therefore, the test per se is inevitably large in scale. Further, it is necessary to actually apply a dynamic acceleration of vibration to the acceleration sensor. This results in complexity of the testing procedure.

For this background, the inventors of the present Patent Application proposed the solution to the problems. The solution takes the form of a centrifugal acceleration tester capable of remarkably improving the testing accuracy in Japanese Patent Laid-Open Publication No. Hei. 7-110342. In the tester, an object to be tested, i.e., a acceleration sensor, is placed on a testing table, and a predetermined acceleration (i.e., a DC component of acceleration) is applied to the object, whereby the characteristics of the acceleration sensor are examined with high precision.

FIG. 5 is a schematic illustration of the centrifugal acceleration tester. As shown, a signal line 51 is used for deriving an acceleration signal from a sensor table placed on the turntable. A control signal line 52 feeds a control signal to the servo motor to drive the sensor table for its turn. The signal line 51 and the control signal line 52 are gathered together and located on one of the sides (usually the underside) of the turntable, and a coupling ring 53 is applied to the bundle of the lines. In the wiring, noise derived from the control signal line 52 to the servo motor leaks into the signal line 51, viz., it is superposed on a signal traveling through the signal line 51 as shown in FIG. 6. The actual use of the acceleration test showed the fact that this noise makes it difficult to exactly measure the characteristics of the acceleration sensor.

In addition, when the small-diameter turntable is turned to examine the characteristics of the acceleration sensor by use of the centrifugal acceleration tester, an acceleration is generated by a starting torque of the servo motor. This acceleration serves as noise to thereby deteriorate an accuracy of the measurement. In measuring the characteristics of the acceleration sensor, the small-diameter turntable needs to shift its operation mode from a non-rotation mode to a rotation mode by the drive of the second servo motor. At this time, friction resistance of the bearing, weight of the small-diameter turntable, and other factors cause a starting torque. This starting torque serves as noise to deteriorate an accuracy of the measurement for examining the characteristics of the acceleration sensor.

SUMMARY OF THE INVENTION

Accordingly, an object of the present invention is to provide a centrifugal acceleration tester having an acceleration sensor capable of preventing noise from leaking from the control signal line to the signal line and providing a highly accurate measurement of the sensor characteristics. To solve the noise leaking problem, the present invention locates the signal line for deriving a signal from a sensor table on one of the sides of the turntable, and the control signal line for transmitting a signal to drive the sensor table on the other side of the turntable. In other words, the signal line and the control signal line are separated from each other by use of the turntable. The arrangement of these lines succeeds in the leaking of noise from the control signal line into the signal line and in providing an accurate measurement of the sensor characteristics.

Another object of the invention is to provide a turntable type acceleration generating apparatus having an acceleration sensor capable of preventing noise from leaking from the control signal line to the signal line and providing a highly accurate measurement of the sensor characteristics.

It is still another object of the invention to provide a centrifugal acceleration tester capable of eliminating the adverse affect by the acceleration caused by the starting torque of the servo motor, to thereby provide a highly accurate measurement for examining the characteristics of the acceleration sensor. To this end, the second servo motor starts its rotation in the reverse turn mode, and gathering of data starts when said second servo motor enters a forward turn mode and a servo-motor control voltage exceeds a zero-cross point on a graph representative of a variation of servo-motor control voltage to time.

It is still another object of the invention to provide a turntable acceleration generating apparatus capable of eliminating the adverse affect by the acceleration caused by the starting torque of the servo motor, to thereby provide a highly accurate measurement for examining the characteristics of the acceleration sensor. To this end, the second servo motor starts its rotation in the reverse turn mode, and gathering of data starts when said second servo motor enters a forward turn mode and a servo-motor control voltage exceeds a zero-cross point on a graph representative of a variation of servo-motor control voltage to time.

The above and other objects can be achieved by a provision of a turntable acceleration generating apparatus which, according to the present invention, includes a first servo motor; a large-diameter turntable rotated by the first servo motor; and a small-diameter turntable being mounted at a proper position on the circumference of the large-diameter turntable such that the small-diameter turntable is rotated by a rotary shaft; wherein a signal line for deriving signals from an acceleration sensor is located on one of the sides of the large-diameter turntable, and a control signal line for applying control signal to a second servo motor is located on the other side of the large-diameter turntable.

Further the above objects can also be achieved by a provision of a turntable acceleration generating apparatus which, according to the present invention, includes a first servo motor; a large-diameter turntable rotated by the first servo motor; and a small-diameter turntable being mounted at a proper position on the circumference of the large-diameter turntable such that the small-diameter turntable is rotated by a rotary shaft; wherein a second servo motor starts its rotation in the reverse turn mode.

DESCRIPTION OF THE PREFERRED EMBODIMENTS

The preferred embodiment of the present invention will now be described with reference to the accompanying drawings.

Figure 1:
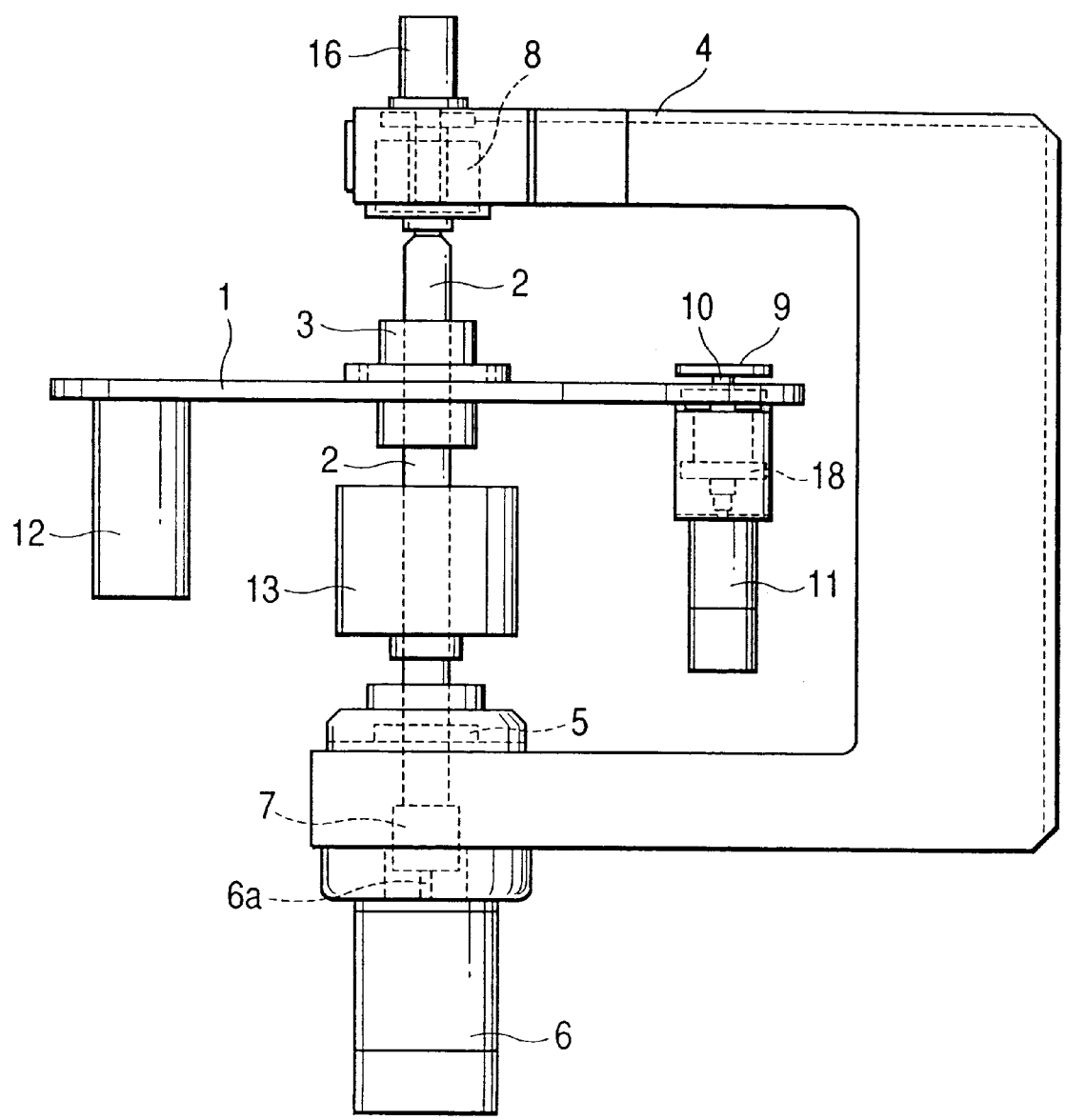
FIG. 1 is an elevational view schematically showing a turntable acceleration generating apparatus which is an embodiment of t present invention.

FIG. 1 is an elevational view schematically showing a turntable acceleration generating apparatus which is an embodiment of the present invention.

Figure 2:
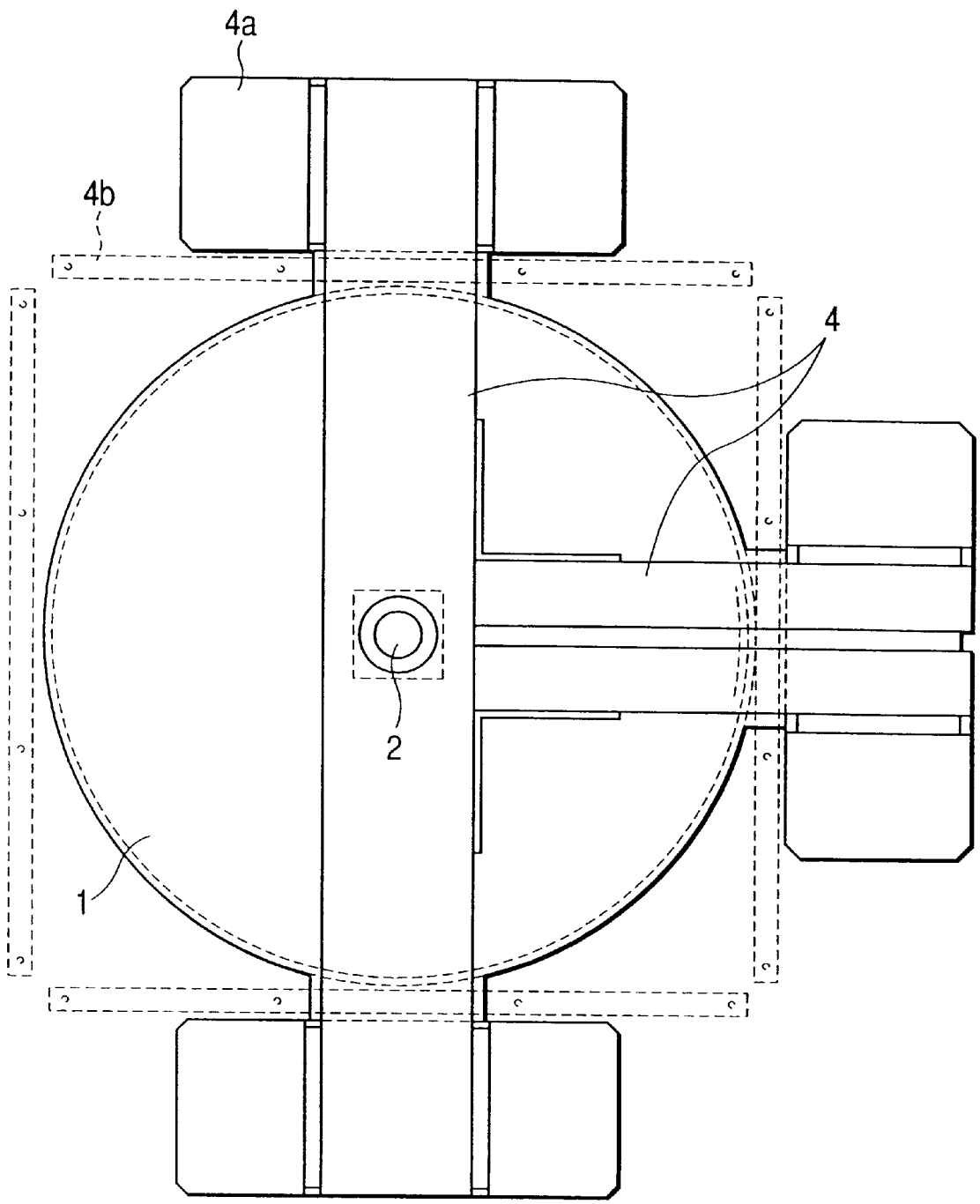
FIG. 2 is a plan view showing a turntable of the turntable acceleration generating apparatus.

FIG. 2 is a plan view showing a turntable of the turntable acceleration generating apparatus.

Figure 3:
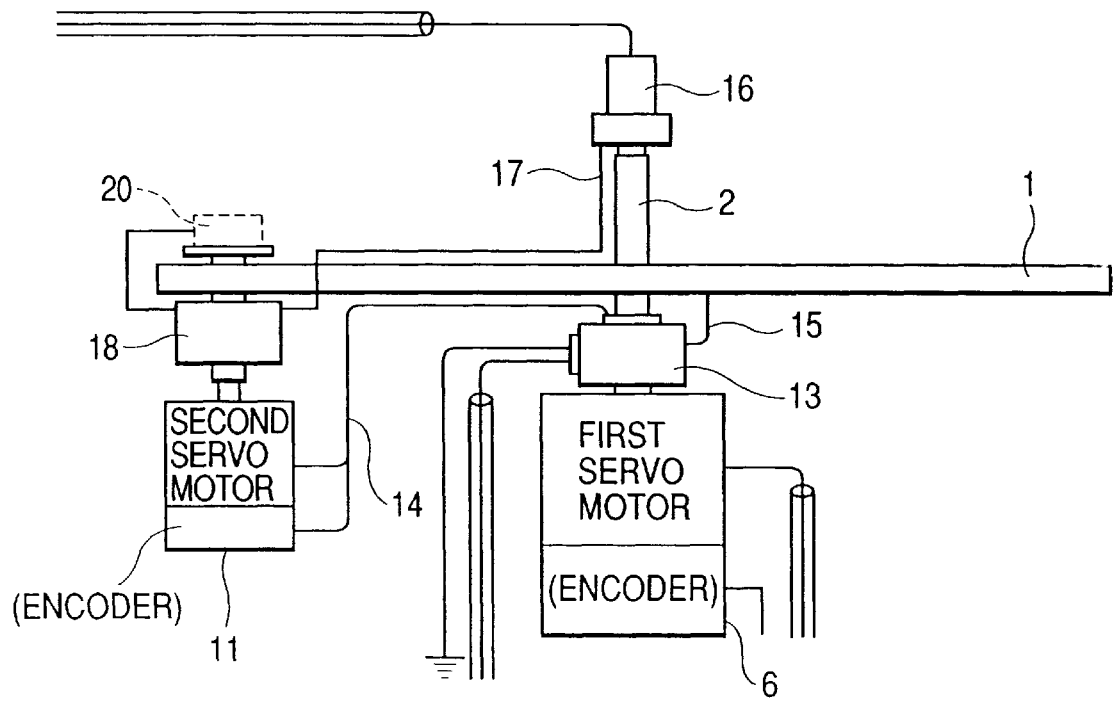
FIG. 3 is a schematic diagram of the FIG. 1 apparatus in which the wiring of the apparatus is well illustrated.
Figure 4:
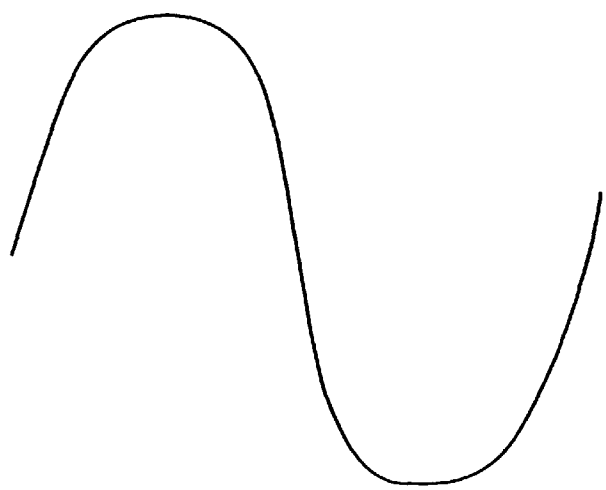
FIG. 4 is a graph showing the result of a measurement of an acceleration sensor.
Figure 5:
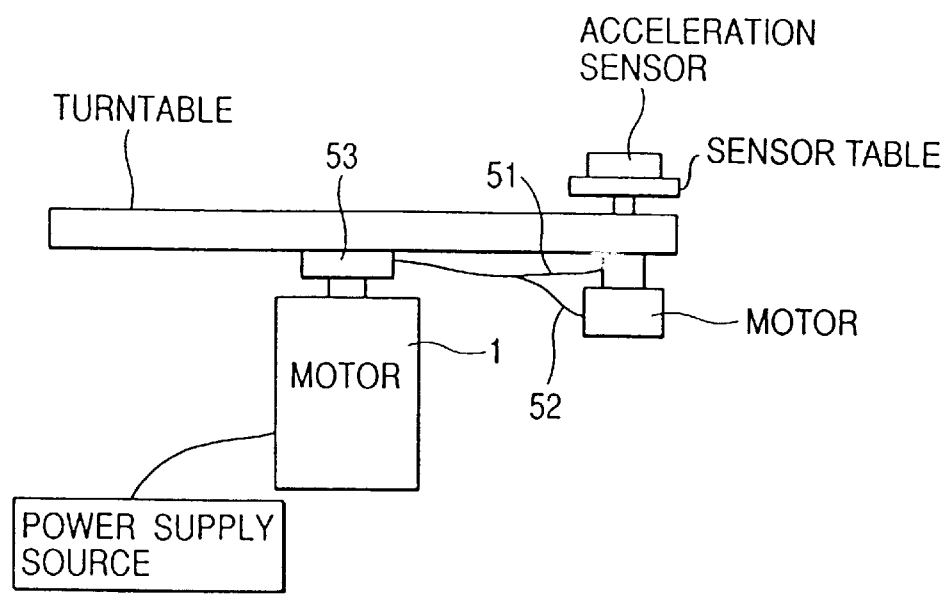
FIG. 5 is an elevational view schematically showing a conventional turntable acceleration generating apparatus.
Figure 6:
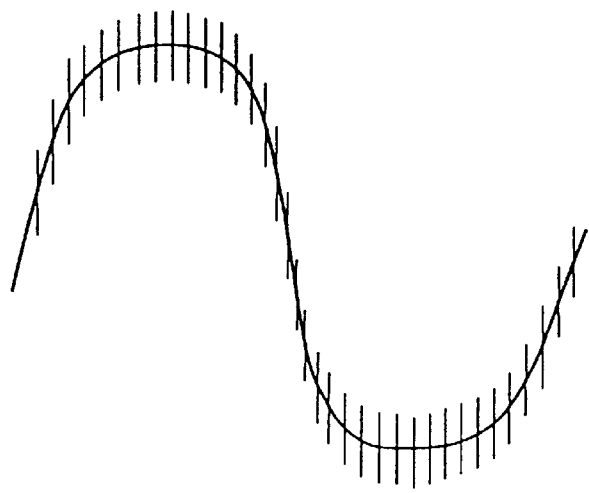
FIG. 6 is a graph showing a waveform of an output signal of the turntable acceleration generating apparatus of FIG. 5.

FIG. 3 is a schematic diagram of the FIG. 1 apparatus in which the wiring of the apparatus is well illustrated.

Reference is made to FIGS. 1 and 2. In those figures, reference numeral 1 designates a large-diameter turntable; 2 is a rotary shaft; 3 is a fixing means; and 4 is a table support arm. The large-diameter turntable 1 is made of nonmagnetic material, e.g., aluminum or copper. The rotary shaft 2 is fixed to the large-diameter turntable 1 by means of the fixing means 3. The rotary shaft 2 of the large-diameter turntable 1 is supported at the upper and lower ends with the table support arm 4. The table support arm 4 is shaped like the letter U when viewed from the side. The upper and lower ends of the rotary shaft 2 are, respectively, supported with the upper and lower legs of the U of the table support arm 4. The table support arm 4 is surrounded by reinforced members 4a and covers 4b. The table support arm 4 may be replaced with any means if it is capable of supporting the upper and lower ends of the rotary shaft 2 of the large-diameter turntable 1.

A thrust bearing 5 is coupled to the end of the lower leg of the table support arm 4 and further to a servo motor (referred to as a first servo motor) 6 for driving the large-diameter turntable 1. The thrust bearing 5 rotatably supports the lower end of the rotary shaft 2. The first servo motor 6 is connected to a control unit by way of a power supply line (not shown) and a control signal line.

The output shaft 6a of the first servo motor 6 is coupled with the lower end of the rotary shaft 2 of the large-diameter turntable 1, with a coupling 7 interposed therebetween. The upper end of the rotary shaft 2 of the large-diameter turntable 1 is supported by the upper leg of the table support arm 4, with bearing 8 interposed therebetween. With such a structure, when the first servo motor 6 is driven, the large-diameter turntable 1 is rotated with respect to the table support arm 4.

A small-diameter turntable 9 as a sensor table is rotatably supported at a proper position of the large-diameter turntable 1. A rotary shaft 10 of the small-diameter turntable 9 is dynamically coupled with the output shaft of a servo motor (referred to as second servo motor) 11 for driving the small-diameter turntable 9. When the second servo motor 11 is driven, the small-diameter turntable 9 is rotated.

The large-diameter turntable 1 uses a balancer 12 for well balancing the turntable per in its rotation. The balancer 12 is located at a proper location of the large-diameter turntable 1 and is well balanced with the weight of the small-diameter turntable 9 and the second servo motor 11. A smooth rotation of the large-diameter turntable 1 is ensured with use of the balancer 12.

As shown in FIG. 3, a first slip ring 13 is disposed on the rotary shaft 2 of the large-diameter turntable 1 at its location under the large-diameter turntable 1. The first slip ring 13 is connected to a power line for supplying electric power to the second servo motor 11 and a control signal line, both lines being designated by numeral 14, and an earth line 15 of the large-diameter turntable 1. The power line and the control signal line will be referred to as a power/control signal line 14. The large-diameter turntable 1 is earthed through the first slip ring 13, and serves as a shielding plate. The second servo motor 11 is supplied with electric power. Even when the large-diameter turntable 1 is rotating, the electric power and control signals are supplied to the second servo motor 11 through the first slip ring 13, from the control unit located outside the turntable acceleration generating apparatus.

A second slip ring 16 is disposed on the rotary shaft 2 of the large-diameter turntable 1 at its location above the large-diameter turntable 1. (In this instance, it is disposed above the table support arm 4.) The second slip ring 16 is connected to one end of a signal line 17 for deriving a signal from an acceleration sensor attached onto the small-diameter turntable 9. The other end of the signal line 17 is connected to a third slip ring 18 which is provided on the rotary shaft of the small-diameter turntable 9. A signal derived from the acceleration sensor attached onto the small-diameter turntable 9 can be led to a measuring device located outside the acceleration generating apparatus, through the third and second slip rings 18 and 16 even when the small-diameter turntable 9 and the large-diameter turntable 1 are both rotating.

The third slip ring 18 is located under the large-diameter turntable 1. Therefore, the signal line 17 is close to the power/control signal line 14 located under the large-diameter turntable 1; however, a region where those lines are close to each other is small in its range. Therefore, little noise leaks from the control signal line to the signal line 17. The noise is completely shut off if the third slip ring 18 is disposed above the large-diameter turntable 1 and the signal line 17 is disposed above the large-diameter turntable 1.

Further, if the signal line 17 and the third slip ring 18 are assembled into a coaxial cable, the noise leaking is perfectly shut off owing to the shield line of the cable.

The characteristics of the acceleration sensor is measured by the thus constructed turntable acceleration generating apparatus as described hereinbelow.

1) An acceleration sensor 20 is fixed onto the small-diameter turntable 9 on the large-diameter turntable 1.

2) The first servo motor 6 is driven to rotate the large-diameter turntable 1 to generate a centrifugal force. At the same time, the second servo motor 11 is driven to rotate the small-diameter turntable 9 to generate an acceleration at a given magnitude and in a predetermined direction. Under this condition, signals are derived from the acceleration sensor and measured.

3) Electric power is fed to the first servo motor 6 through the power/control signal line 14, and electric power control signals are fed to the second servo motor 11 through the same line. Incidentally, the large-diameter turntable 1 is earthed through the first slip ring 13.

4) The signals that are derived from the acceleration sensor 20 are transmitted to the measuring device, through the third slip ring 18 provided on the rotary shaft of the small-diameter turntable 9, the signal line 17 located above the large-diameter turntable 1, and the second slip ring 16, whereby necessary data are gathered.

As described above, in the turntable acceleration generating apparatus of the invention, the first servo motor 6 for turning the large-diameter turntable 1, the second servomotor 11 for turning the small-diameter turntable 9, and the power/control signal line 14 for supplying electric power and control signals to the second servo motor 11 are located one of the sides of the large-diameter turntable 1 (under the turntable 1 in the instant embodiment), and the signal line 17 for deriving signals from the acceleration sensor 20 fixed on the small-diameter turntable 9 is located on the other side of the turntable 1 (above the turntable in the instant embodiment).

This technical feature produces the following advantageous effect: no noise is leaked from the control signal line to the power/control signal line, whereby the characteristics of the acceleration sensor can be measured at high accuracy.

Further, the large-diameter turntable 1 is earthed. Because of this, the large-diameter turntable 1 serves as a shielding plate. The signal line 17 that is separated from the power/control signal line 14 by the large-diameter turntable 1 receives no noise from the control signal line. The measuring accuracy is considerably increased.

Figure 7:
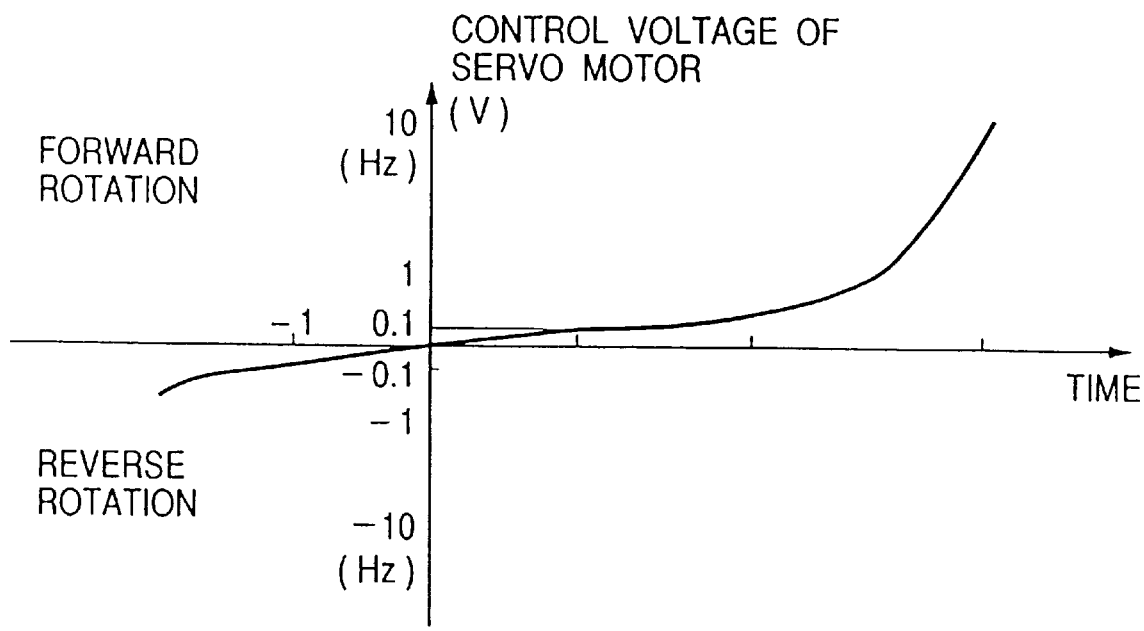
FIG. 7 is a graph showing a state of operation of a second servo motor.

Furthermore, for the characteristic measurement, to suppress noise caused by the starting torque of the second servo motor, as shown in FIG. 7 showing a graph representative of a variation of servo-motor control voltage to time, the second servo motor starts its rotation in the reverse turn mode, and gathering of data starts when said second servo motor enters a forward turn mode and a servo-motor control voltage exceeds a zero-cross point on the graph. Therefore, the characteristics of the acceleration sensor can exactly be measured by use of data gathered at the zero-cross point and the subsequent points on the time axis of the above graph. In other words, the frequency characteristic of the acceleration sensor can be measured by use of an output signal at 0.1 Hz, which is free from noise.

It is evident that the method of removing the adverse effect by the starting torque is applicable to the centrifugal acceleration tester and others, in addition to the turntable acceleration generating apparatus.

As seen from the foregoing description, there is provided a turntable acceleration generating apparatus for applying an acceleration at a predetermined magnitude and in a predetermined direction to an acceleration sensor (i.e., an acceleration of the DC component) located on a testing table by applying a centrifugal force to the acceleration sensor, the apparatus being characterized in that a signal line for deriving signals from the acceleration sensor and a power and control signal line are separately located such that the signal line is located on one of the sides of a large-diameter turntable, and the power and control signal line is located on the other side of the large-diameter turntable. Therefore, there is no chance that noise generated by the control signal line enters the signal line. Further, the large-diameter turntable is earthed, so that the leaking of noise from the power and control signal line to the signal line can be effectively blocked. The characteristics of the acceleration sensor can be measured at high accuracy.

Moreover, as described above, in the turntable acceleration generating apparatus of the present invention, in measuring the characteristics of an acceleration sensor, a second servo motor starts its rotation in the reverse turn mode, and gathering of data starts when the second servo motor enters a forward turn mode and a servo-motor control voltage exceeds a zero-cross point on a graph representative of a variation of servo-motor control voltage to time.

What is claimed is:

1. A turntable acceleration generating apparatus comprising:
   a first servo motor joining a rotary shaft with a top and a bottom end, said first servo motor located at said bottom end of said rotary shaft;
   a large-diameter turntable rotated by said first servo motor and mounted between said top and bottom ends of said rotary shaft;
   a small-diameter turntable being mounted on said large-diameter turntable at a position offset from a central axis of said large-diameter turntable;
   a second servo motor having a rotary shaft connected to said small-diameter turntable for causing rotation thereof; and
   a signal line for deriving signals from an acceleration sensor located on a side of said large-diameter turntable, and a control signal line for applying a control signal to said second servo motor located on another side of said large-diameter turntable;
   wherein said large-diameter turntable is grounded such that said large-diameter turntable prevents noise leakage from said control signal line to said signal line.

2. The turntable acceleration generating apparatus according to claim 1, wherein said signal line and said control signal line are each assembled into a separate coaxial cable.

3. The turntable acceleration generating apparatus according to claim 1, wherein a signal derived from said acceleration sensor on said small-diameter turntable is transmitted to a measuring device located outside said turntable acceleration generating apparatus through a third slip ring provided on said rotary shaft of said small-diameter turntable and a second slip ring provided on said rotary shaft of said large-diameter turntable, and said control signal line of said second serve motor is connected to a power source located outside said turntable acceleration generating apparatus, through a first slip ring provided on said rotary shaft of said large-diameter turntable.

4. The turntable acceleration generating apparatus according to claim 1, wherein said second servo motor for rotating said small-diameter turntable starts its rotation in a reverse turn mode representing a negative servo motor control voltage, and where gathering of data by means of a measuring device starts when said second servo motor enters a forward turn mode representing a positive servo motor control voltage.

5. A turntable acceleration generating apparatus comprising:
   a first servo motor joining a rotary shaft with a top and a bottom end, said first servo motor located at said bottom end of said rotary shaft;
   a large-diameter turntable rotated by said first servo motor and mounted between said top and bottom ends of said rotary shaft;
   a small-diameter turntable being mounted on said large-diameter turntable at a position offset from a central axis of said large-diameter turntable;
   a support arm having a first end connected at said top end of said rotary shaft and a second end connected at said bottom end of said rotary shaft, whereby said arm supports said rotary shaft and said rotary shaft rotates relative to said support arm;
   a second servo motor having a rotary shaft connected to said small-diameter turntable for causing rotation thereof; and
   a signal line for deriving signals from an acceleration sensor located on a side of said large-diameter turntable, and a control signal line for applying a control signal to said second servo motor located on another side of said large-diameter turntable.

6. The turntable acceleration generation apparatus according to claim 5, wherein said second servo motor for rotating said small-diameter turntable starts its rotation in a reverse turn mode representing a negative servo motor control voltage, and where gathering of data by means of a measuring device starts when said second servo motor enters a forward turn mode representing a positive servo motor control voltage.

7. The turntable acceleration generation apparatus according to claim 5, wherein said large-diameter turntable is grounded such that said large-diameter turntable prevents noise leakage from said control signal line to said signal line.

8. The turntable acceleration generating apparatus according to claim 5, wherein said signal line and said control signal line are each assembled into a separate coaxial cable.

9. The turntable acceleration generating apparatus according to claim 5, wherein a signal derived from said acceleration sensor on said small-diameter turntable is transmitted to a measuring device located outside said turntable acceleration generating apparatus through a third slip ring provided on said rotary shaft of said small-diameter turntable and a second slip ring provided on said rotary shaft of said large-diameter turntable and said control signal line of said second servo motor is connected to a power source located outside said turntable acceleration generating apparatus, through a first slip ring provided on said rotary shaft of said large-diameter turntable.

10. A turntable acceleration generating apparatus comprising:
    a first servo motor joining a rotary shaft with a top and a bottom end, said first servo motor located at said bottom end of said rotary shaft;
    a large-diameter turntable rotated by said first servo motor and mounted between said top and bottom ends of said rotary shaft;
    a small-diameter turntable being mounted on said large-diameter turntable at a position offset from a central axis of said large-diameter turntable; and
    a second servo motor having a rotary shaft connected to said small-diameter turntable for causing rotation thereof, said second servo motor starting its rotation in a reverse turn mode representing a negative servo motor control voltage, and a measuring device, wherein said measuring device starts gathering data when said second servo motor enters a forward turn mode representing a positive servo motor control voltage subsequent to said reverse turn mode.

11. A turntable acceleration generating apparatus comprising:
    a first servo motor joining a rotary shaft with a top and a bottom end, said first servo motor located at said bottom end of said rotary shaft;
    a large-diameter turntable rotated by said first servo motor and mounted between said top and bottom ends of said rotary shaft;
    a small-diameter turntable being mounted on said large-diameter turntable at a position offset from a central axis of said large-diameter turntable;
    a support arm having a first end connected at said top end of said rotary shaft and a second end connected at said bottom end of said rotary shaft, whereby said arm supports said rotary shaft and said rotary shaft rotates relative to said support arm; and
    a second servo motor having a rotary shaft connected to said small-diameter turntable for causing rotation thereof, said second servo motor starting its rotation in a reverse turn mode representing a negative servo motor control voltage, and a measuring device, wherein said measuring device starts gathering data when said second servo motor enters a forward turn mode representing a positive servo motor control voltage subsequent to said reverse turn mode.

12. A turntable acceleration generating apparatus comprising:
    a first servo motor joining a rotary shaft with a top and a bottom end, said first servo motor located at said bottom end of said rotary shaft;
    a large-diameter turntable rotated by said first servo motor and mounted between said top and bottom ends of said rotary shaft;
    a small-diameter turntable being mounted on said large-diameter turntable at a position offset from a central axis of said large-diameter turntable;
    a support arm having a first end connected at said top end of said rotary shaft and a second end connected at said bottom end of said rotary shaft, whereby said arm supports said rotary shaft and said rotary shaft rotates relative to said support arm;
    a second servo motor having a rotary shaft connected to said small-diameter turntable for causing rotation thereof, said second servo motor starting its rotation in a reverse turn mode representing a negative servo motor control voltage, and a measuring device, wherein said measuring device starts gathering data when said second servo motor enters a forward turn mode representing a positive servo motor control voltage subsequent to said reverse turn mode; and a signal line for deriving signals from an acceleration sensor located on one side of said large-diameter turntable, and a control signal line for applying a control signal to the second servo motor located on another side of said large-diameter turntable;

wherein said large-diameter turntable is grounded such that said large-diameter turntable prevents noise leakage from said control signal line to said signal line.

13. A turntable acceleration generating apparatus comprising:

a first servo motor joining a rotary shaft with a top and a bottom end, said first servo motor located at said bottom end of said rotary shaft;

a large-diameter turntable rotated by said first servo motor and mounted between said top and bottom ends of said rotary shaft;

a small-diameter turntable being mounted on said large-diameter turntable at a position offset from a central axis of said large-diameter turntable;

a second servo motor having a rotary shaft connected to said small-diameter turntable for causing rotation thereof;

a signal line for deriving signals from an acceleration sensor located on a side of said large-diameter turntable, and a control signal line for applying a control signal to said second servo motor located on another side of said large-diameter turntable; and means for grounding said large-diameter turntable such that said large-diameter turntable prevents noise leakage from said control signal line to said signal line.

14. The turntable acceleration generating apparatus according to claim 13, wherein said signal line and said control signal line are both assembled into a coaxial cable.

15. The turntable acceleration generating apparatus according to claim 13, wherein a signal derived from said acceleration sensor on said small-diameter turntable is transmitted to a measuring device located outside said turntable acceleration generating apparatus through a third slip ring provided on said rotary shaft of said small-diameter turntable and a second slip ring provided on said rotary shaft of said large-diameter turntable, and said control signal line of said second servo motor is connected to a power source located outside said turntable acceleration generating apparatus, through a first slip ring provided on said rotary shaft of said large-diameter turntable.

16. The turntable acceleration generating apparatus according to claim 13, wherein said second servo motor for rotating said small-diameter turntable starts its rotation in a reverse turn mode representing a negative servo motor control voltage, and where gathering of data by means of a measuring device starts when said second servo motor enters a forward turn mode representing a positive servo motor control voltage.

* * * * *